(12) United States Patent
Geng et al.

(10) Patent No.: US 11,425,474 B2
(45) Date of Patent: Aug. 23, 2022

(54) RANGING METHOD AND COMMUNICATION METHOD FOR OPTICAL NETWORK, OLT, ONU, AND OPTICAL NETWORK SYSTEM

(71) Applicant: ZTE Corporation, Shenzhen (CN)

(72) Inventors: Dan Geng, Shenzhen (CN); Mingsheng Li, Shenzhen (CN); Jinsong Bei, Shenzhen (CN); Liquan Yuan, Shenzhen (CN); Yong Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/277,946

(22) PCT Filed: Sep. 24, 2019

(86) PCT No.: PCT/CN2019/107464
§ 371 (c)(1),
(2) Date: Mar. 19, 2021

(87) PCT Pub. No.: WO2020/063570
PCT Pub. Date: Apr. 2, 2020

(65) Prior Publication Data
US 2021/0352387 A1 Nov. 11, 2021

(30) Foreign Application Priority Data
Sep. 25, 2018 (CN) .......................... 201811116921.9

(51) Int. Cl.
*H04Q 11/00* (2006.01)

(52) U.S. Cl.
CPC ..... *H04Q 11/0067* (2013.01); *H04Q 11/0005* (2013.01); *H04Q 2011/0047* (2013.01);
(Continued)

(58) Field of Classification Search
CPC .................................................. H04Q 11/0067
See application file for complete search history.

(56) References Cited

U.S. PATENT DOCUMENTS

| 9,048,946 | B1 * | 6/2015 | Roberts | ................ | H04J 3/0682 |
| 2012/0121253 | A1 * | 5/2012 | Zhang | ................ | H04Q 11/0067 398/25 |

(Continued)

FOREIGN PATENT DOCUMENTS

| CN | 101394229 A | 3/2009 |
| CN | 102075820 A | 5/2011 |

(Continued)

OTHER PUBLICATIONS

International Search Report for corresponding application PCT/CN2019/107464 filed Sep. 24, 2019; dated Dec. 20, 2019.
(Continued)

*Primary Examiner* — Shi K Li
(74) *Attorney, Agent, or Firm* — Cantor Colburn LLP

(57) ABSTRACT

Provided are a ranging method and a communication method for an optical network, an Optical Line Terminal (OLT), an Optical Network Unit (ONU), and an optical network system. The OLT sends a broadcast message to the ONU, the broadcast message being used to indicate an uplink bandwidth allocated to the ONU. The OLT opens a quiet window for the ONU in a predetermined region. The OLT receives an uplink signal sent by the ONU at the quiet window.

9 Claims, 2 Drawing Sheets

(52) U.S. Cl.
CPC ............... *H04Q 2011/0064* (2013.01); *H04Q 2011/0079* (2013.01); *H04Q 2011/0086* (2013.01)

(56) References Cited

U.S. PATENT DOCUMENTS

2016/0352451 A1* 12/2016 Luo ..................... H04B 10/27
2017/0279527 A1*  9/2017 Kim .................... H04B 10/272

FOREIGN PATENT DOCUMENTS

| | | |
|---|---|---|
| CN | 102883234 A | 1/2013 |
| CN | 105830369 A | 8/2016 |
| CN | 107342973 A | 11/2017 |
| EP | 2448152 A1 | 5/2012 |
| EP | 3550742 A1 | 10/2019 |
| WO | 2011060734 A1 | 5/2011 |

OTHER PUBLICATIONS

Draft Recommendation ITU-T G.987.3 (ex G.xgpon.3) )(new) Rev. 2 (AR), "10-Giabit-capable passive optical netwroks (XG-PON): Transmission Convergence (TC) Specifications", pp. 1-151, Oct. 18, 2020, XP017737870.

European Search Report for corresponding application EP19865931; dated Nov. 16, 2021.

* cited by examiner

RANGING METHOD AND COMMUNICATION METHOD FOR OPTICAL NETWORK, OLT, ONU, AND OPTICAL NETWORK SYSTEM

CROSS-REFERENCE TO RELATED APPLICATIONS

The present disclosure claims priority to Chinese Patent Application No. 201811116921.9, filed to the China Patent Office on Sep. 25, 2018, the disclosure of which is hereby incorporated by reference in its entirety.

TECHNICAL FIELD

The present disclosure relates, but is not limited to, the field of communications.

BACKGROUND

With the development of a network technology, a large number of services such as audio, data and video can be transmitted over a network. Therefore, the requirement for bandwidth is continuously improved, and a Passive Optical Network (PON) is generated under this circumstance.

FIG. 1 is a topological structure diagram of a PON system in the related art. As shown in FIG. 1, the PON system is generally composed of an Optical Line Terminal (OLT) at a local side, an Optical Network Unit (ONU) at a user side, and an Optical Distribution Network (ODN), and generally adopts a point-to-multipoint network structure. The ODN is composed of passive optical devices such as single-mode optical fibers, optical splitters and optical connectors, and provides a optical transmission medium for a physical connection between the OLT and the ONU. At present, the development of low-delay services such as virtual reality services and 5G wireless services raises low-delay demands for the PON.

SUMMARY

According to an aspect of embodiments of the present disclosure, a ranging method for an optical network is provided, which may include the following steps: an OLT broadcasts a first message, the first message carrying a first uplink bandwidth allocated by the OLT to an ONU to be registered within a specified distance range from the OLT and a first sending time for instructing the ONU to be registered to send a first uplink signal; the OLT opens a first quiet window corresponding to the specified distance range, a starting moment of the first quiet window being not later than a moment at which an optical signal sent by an ONU with a minimum distance from the OLT within the specified distance range at the first sending time arrives at the OLT, and an ending moment of the first quiet window being not earlier than a moment at which an optical signal sent by an ONU with a maximum distance from the OLT within the specified distance range at the first sending time arrives at the OLT; the OLT receives the first uplink signal sent by the ONU to be registered over the first uplink bandwidth within the first quiet window, the first uplink signal carrying delay information of the ONU to be registered, and the delay information being time delay information between time at which the first uplink signal is actually sent by the ONU to be registered and the first sending time; and the OLT estimates a first distance between the ONU to be registered and the OLT according to a first moment for broadcasting the first message, the first sending time, the time delay information, and a second moment for receiving the first uplink signal.

According to another aspect of the embodiments of the present disclosure, another ranging method for an optical network is provided, which may include the following steps: an ONU to be registered receives a first message broadcast by an OLT, the ONU to be registered being located within a specified distance range from the OLT, and the first message carrying a first uplink bandwidth allocated by the OLT to the ONU to be registered and a first sending time for instructing the ONU to be registered to send a first uplink signal; and the ONU to be registered sends the first uplink signal to the OLT over the first uplink bandwidth, the first uplink signal carrying delay information of the ONU to be registered, and the delay information being time delay information between time at which the first uplink signal is actually sent by the ONU to be registered and the first sending time, so that the OLT receives the first uplink signal within an opened first quiet window, and estimates a first distance between the ONU to be registered and the OLT according to a first moment for broadcasting the first message by the OLT, the first sending time, the time delay information, and a second moment for receiving the first uplink signal by the OLT. A starting moment of the first quiet window corresponding to the specified distance range may be not later than a moment at which an optical signal sent by an ONU with a minimum distance from the OLT within the specified distance range at the first sending time arrives at the OLT, and an ending moment of the first quiet window may be not earlier than a moment at which an optical signal sent by an ONU with a maximum distance from the OLT within the specified distance range at the first sending time arrives at the OLT.

According to yet another aspect of the embodiments of the present disclosure, a communication method for an optical network is provided, which may be applied to an OLT. The method may include the following steps: a broadcast message is sent to an ONU, the broadcast message being used to indicate an uplink bandwidth allocated to the ONU; a quiet window is opened for the ONU in a predetermined region; and an uplink signal sent by the ONU is received at the quiet window.

According to another aspect of the embodiments of the present disclosure, another communication method for an optical network is provided, which may be applied to an ONU. The method may include the following steps: a broadcast message sent by an OLT is received, the broadcast message being used to indicate an uplink bandwidth allocated to the ONU; and an out-of-band uplink signal is sent to the OLT.

According to yet another aspect of the embodiments of the present disclosure, an OLT is provided, which may include: a sending module, configured to send a broadcast message to an ONU, the broadcast message being used to indicate an uplink bandwidth allocated to the ONU; an opening module, configured to open a quiet window for the ONU in a predetermined region; and a receiving module, configured to receive an uplink signal sent by the ONU at the quiet window.

According to yet another aspect of the embodiments of the present disclosure, an ONU is provided, which may include: a receiving module, configured to receive a broadcast message sent by an OLT, the broadcast message being used to indicate an uplink bandwidth allocated to the ONU; and a sending module, configured to send an uplink signal to the OLT.

According to yet another aspect of the embodiments of the present disclosure, an optical network system is provided, which may include: an OLT and an ONU. The OLT may be configured to: send a broadcast message to the ONU, the broadcast message being used to indicate an uplink bandwidth allocated to the ONU; open a quiet window for the ONU in a predetermined region; and receive an uplink signal sent by the ONU at the quiet window. The ONU may be configured to: receive a broadcast message sent by the OLT, the broadcast message being used to indicate an uplink bandwidth allocated to the ONU; and send an uplink signal to the OLT.

According to yet another aspect of the embodiments of the present disclosure, a computer-readable storage medium is provided. A computer program may be stored thereon. The computer program may be configured to, when run, perform the ranging method for an optical network or the communication method for an optical network provided in any one of the above aspects.

According to yet another aspect of the embodiments of the present disclosure, an electronic device is provided. The electronic device may include a memory and a processor. The memory may store a computer program. The processor may be configured to run the computer program to perform the ranging method for an optical network or the communication method for an optical network provided in any one of the above aspects.

DETAILED DESCRIPTION OF THE EMBODIMENTS

Figure 1:
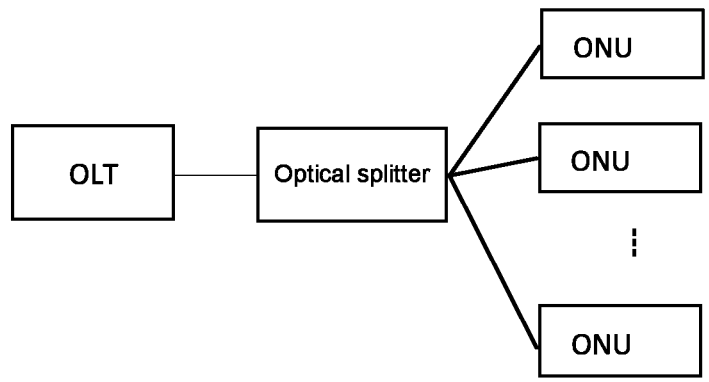
FIG. 1 is a topological structure diagram of a PON system in the related art.

The present disclosure is described below with reference to the drawings and in conjunction with the embodiments in detail. It is to be noted that embodiments in the present application and characteristics in the embodiments may be combined under the condition of no conflicts.

It is to be noted that the specification and claims of the disclosure and the terms "first", "second" and the like in the drawings are used to distinguish similar objects, and do not need to describe a specific sequence or a precedence order.

In the related art, in the registration stage of an ONU, an OLT needs to perform ranging on the ONU to be registered. Since the OLT does not know a distance from the ONU to be registered to the OLT in advance, the size of a quiet window opened by the OLT for ranging covers a minimum distance to a maximum distance supported by a PON system. A distance difference between the maximum distance and the minimum distance is 20 km or 40 km. In the PON system supporting a differential distance of 20 km, it is recommended in the standard that a loop delay difference value for the nearest ONU and the farthest ONU is 200 µs, a response time difference value for the ONU is 2 µs, and a maximum random delay value for the ONU is 48 µs. Therefore, the size of a recommended quiet window is 250 µs. In the PON system supporting a differential distance of 40 km, it is recommended in the standard that a loop delay difference value for the nearest ONU and the farthest ONU is 400 µs, a response time difference value for the ONU is 2 µs, and a maximum random delay value for the ONU is 48 µs. Therefore, the size of a recommended quiet window is 450 µs. When the OLT opens a quiet window, the OLT does not allocate an uplink bandwidth for a registered ONU, so that the registered ONU cannot send uplink data within time corresponding to the quiet window. If there is a registered ONU for transmitting a low-delay service in the system, the ONU for transmitting the low-delay service cannot tolerate the PON system to open a large quiet window since the large quiet window may lead to the delayed sending of the low-delay service. In the related PON system, the OLT periodically opens a quiet window for ONU registration, so that the PON system cannot meet the low-delay demands of the low-delay service.

Figure 2:
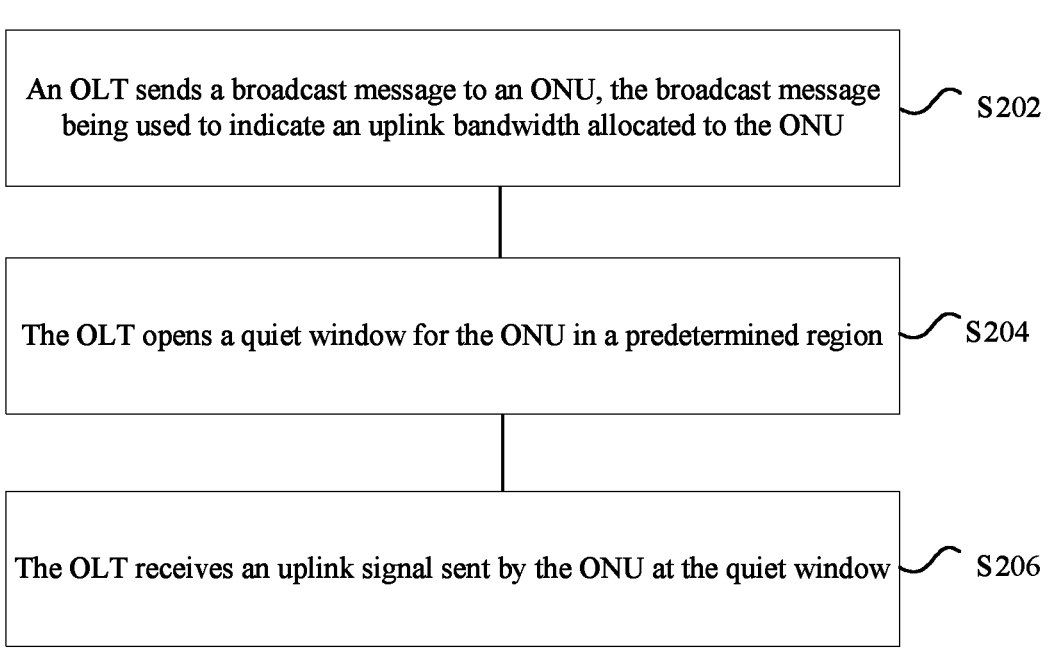
FIG. 2 is a flow diagram of a communication method for an optical network according to an embodiment of the present disclosure.

In view of this, the embodiments of the present disclosure provide a communication method for an optical network. The method may be applied to an optical network architecture as shown in FIG. 1. FIG. 2 is a flow diagram of a communication method for an optical network according to an embodiment of the present disclosure. The method may include steps S202-S206.

In step S202, an OLT sends a broadcast message to an ONU, the broadcast message is used to indicate an uplink bandwidth allocated to the ONU.

In step S204, the OLT opens a quiet window for the ONU in a predetermined region.

In step S206, the OLT receives an uplink signal sent by the ONU at the quiet window.

According to the embodiments provided by the present disclosure, the quiet window is opened for the ONU in the predetermined region, and the quiet window corresponds to the ONU in the predetermined region. The technical problem of excessive delay caused by opening the quiet window in the related art is solved, and the low-delay demands of service transmission on the link are guaranteed.

According to the embodiments provided by the present disclosure, the executive body of the above steps may be an OLT, but is not limited to an OLT.

According to the embodiments provided by the present disclosure, the operation that the quiet window is opened for the ONU in the predetermined region includes that: multiple corresponding quiet windows are opened for ONUs in multiple predetermined regions within a preset cycle, one predetermined region corresponding to one quiet window, or multiple predetermined regions corresponding to multiple non-adjacent quiet windows.

According to the embodiments provided by the present disclosure, the operation of sending the broadcast message to the ONU by the OLT is a bandwidth allocation process of the OLT.

According to the embodiments provided by the present disclosure, the operation that the quiet window is opened for the ONU in the predetermined region includes that: overlapping quiet windows are opened for the ONU in the predetermined region within one or more preset cycles.

According to the embodiments provided by the present disclosure, boundaries of adjacent predetermined regions overlap or boundaries of adjacent predetermined regions do not overlap.

According to the embodiments provided by the present disclosure, the broadcast message is further used to instruct the ONU to respond to the uplink bandwidth using an out-of-band signal. The bandwidth allocation may be an uplink signal with a low rate or a low optical power. The out-of-band signal means that control information and data information are transmitted through different physical channels, which are completely independent from each other and do not affect each other. The physical channels in the present embodiment are different from a physical channel for transmitting data information.

According to the embodiments provided by the present disclosure, the starting moment of the quiet window is a moment at which an ONU with a minimum distance within the predetermined region sends an uplink signal to the OLT, and an ending moment of the quiet window is a moment at which an ONU with a maximum distance within the predetermined region sends an uplink signal to the OLT.

According to the embodiments provided by the present disclosure, the operation that the uplink signal sent by the ONU is received at the quiet window includes that: a registration message sent by the ONU is received at the quiet window, the registration message carrying identity information of the ONU and/or delay information about sending the registration message. Then, ranging may be performed on the ONU according to the delay information.

According to the embodiments provided by the present disclosure, the predetermined region is an optical fiber distance between an ONU and an OLT in a PON system. The predetermined region is a region divided in a geographical range, the OLT is connected with the ONUs through optical fibers, the ONUs with different transmission times are divided into different regions according to the transmission time between the OLT and the ONUs, and optical fiber transmission time ranges of the OLT are the same in the same region (for example, the ranges are from 8 to 10 μs).

Figure 3:
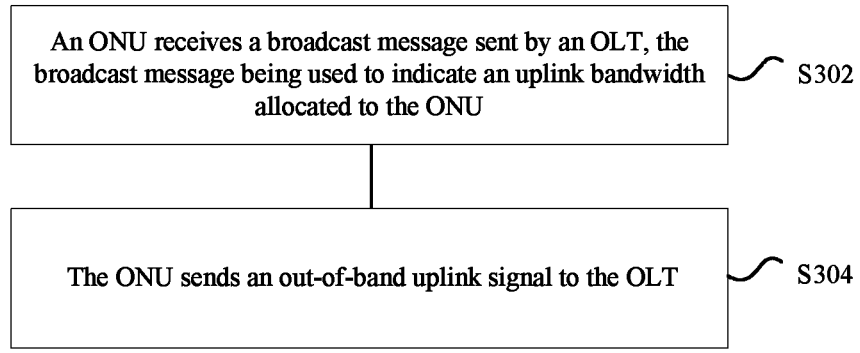
FIG. 3 is a flow diagram of another communication method for an optical network according to an embodiment of the present disclosure.

The embodiments of the present disclosure provide another communication method for an optical network. The method may be applied to the optical network architecture as shown in FIG. 1. FIG. 3 is a flow diagram of another communication method for an optical network according to an embodiment of the present disclosure. The method may include steps S302 and S304.

In step S302, an ONU receives a broadcast message sent by an OLT, the broadcast message being used to indicate an uplink bandwidth allocated to the ONU.

In step S304, the ONU sends an out-of-band uplink signal to the OLT.

According to the embodiments provided by the present disclosure, the operation that the out-of-band uplink signal is sent to the OLT may include that: a registration message is sent to the OLT with a low rate and a low optical power, the registration message carrying identity information of the ONU and/or delay information about sending the registration message.

Through the description of the above implementation manners, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

In the present embodiment, a communication apparatus for an optical network is further provided. The apparatus may be an OLT or an ONU, respectively configured to implement the above embodiments and preferred implementation manners, and those have not been described will not be elaborated. As used below, the term "module" may implement a combination of software and/or hardware of a predetermined function. Although the apparatus described in the following embodiments is preferably implemented in software, hardware, or a combination of software and hardware, is also possible and contemplated.

Figure 4:
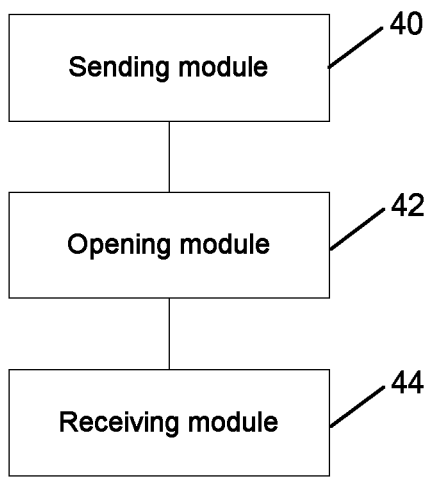
FIG. 4 is a schematic structure diagram of an OLT according to an embodiment of the present disclosure.

As shown in FIG. 4, which is a schematic structure diagram of an OLT according to an embodiment of the present disclosure. The OLT may include: a sending module 40, configured to send a broadcast message to an ONU, the broadcast message being used to indicate an uplink bandwidth allocated to the ONU; an opening module 42, configured to open a quiet window for the ONU in a predetermined region; and a receiving module 44, configured to receive an uplink signal sent by the ONU at the quiet window.

Figure 5:
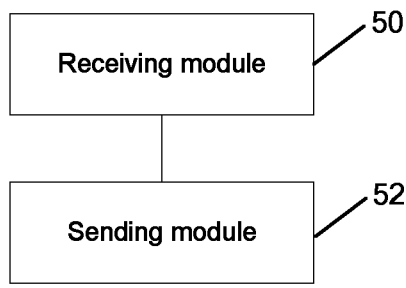
FIG. 5 is a schematic structure diagram of an ONU according to an embodiment of the present disclosure.

As shown in FIG. 5, which is a schematic structure diagram of an ONU according to an embodiment of the present disclosure. The ONU may include: a receiving module 50, configured to receive a broadcast message sent by an OLT, the broadcast message being used to indicate an uplink bandwidth allocated to the ONU; and a sending module 52, configured to send an uplink signal to the OLT.

The embodiments of the present disclosure further provide a communication system for an optical network, which may include the OLT as shown in FIG. 4 and the ONU as shown in FIG. 5.

It is to be noted that each of the above modules may be implemented by software or hardware. For the latter, it may be implemented by, but not limited to, the following manners that the above modules are all located in the same processor; or, the above modules are located in different processors in any combination form respectively.

The embodiments of the present disclosure will be described in detail below with reference to specific examples.

EXAMPLE ONE

In the present example, a distance between the furthest ONU and an OLT supported in a PON system is set to L. For example, L is 20 km. A quiet window opened by the OLT to the ONUs for registration is divided into L quiet windows. Firstly, the OLT opens a small quiet window such as a quiet window of 10 μs. A starting time of the quiet window corresponds to a moment at which an uplink signal sent by an ONU distant from the OLT by 0 km arrives at the OLT, and an ending time of the quiet window corresponds to a moment at which an uplink signal sent by an ONU distant from the OLT by 1 km arrives at the OLT. The OLT opens a second quiet window of 10 μs after a period of time, a starting time corresponds to a moment at which the uplink signal sent by the ONU distant from the OLT by 1 km arrives at the OLT, and an ending time of the quiet window corresponds to a moment at which an uplink signal sent by an ONU distant from the OLT by 2 km arrives at the OLT. By analogy, the OLT opens the Lth quiet window of 10 μs after a period of time, a starting time corresponds to a moment at which an uplink signal sent by an ONU distant from the OLT by 19 km arrives at the OLT, and an ending time corresponds to a moment at which an uplink signal sent by an ONU distant from the OLT by 20 km arrives at the OLT.

The OLT and the ONU send and receive data using the following main steps.

In step 1, the OLT sends a broadcast message to the ONU at a moment T1. The message content is that an uplink bandwidth is allocated to an ONU to be registered, and a starting time of sending uplink data allocated to the ONU in the uplink bandwidth is Ts. The OLT opens a small quiet window such as a quiet window of 10 μs. A starting time of the quiet window corresponds to a moment at which an uplink signal sent by an ONU distant from the OLT by 0 km arrives at the OLT, and an ending time of the quiet window corresponds to a moment at which an uplink signal sent by an ONU distant from the OLT by 1 km arrives at the OLT.

In step 2, the ONU to be registered sends an uplink signal to the OLT with a low rate (for example, a rate of several tens to one hundred megabits per second), and a low optical power (for example, about −30 dBm). The content includes identity information (serial number information or medium access address information) of the ONU and delay information D regarding sending the message.

In step 3, the OLT receives the uplink signal sent by the ONU in step 2 at a moment T2, the OLT calculates a loop delay value of the ONU as T2-T1-Ts-D, and the OLT calculates an optical fiber distance L of the ONU from the OLT as C*(T2-T1-Ts-D)/2, where C is the speed of signal light in optical fibers.

After the OLT finishes the preliminary ranging for the ONU, the OLT sends the allocated uplink bandwidth to the ONU at a moment T3. The starting time of allocation for the ONU in the upstream bandwidth is Tss. The OLT estimates time when the uplink data arrives at the OLT after the ONU adopts a normal rate at which the PON system transmits data according to a preliminary ranging result of the ONU. The OLT further opens an equal or smaller quiet window (for example, 5 μs) that includes the above time of arrival.

In step 4, after the ONU receives the bandwidth allocation of the OLT in step 3, the ONU sends an uplink signal to the OLT at the moment Tss using a normal rate and a normal optical power of data transmitted by the PON system currently.

In step 5, the OLT receives the data sent by the ONU in step 4 at a moment T4, the OLT finishes the accurate ranging of the ONU at the normal rate, and a loop delay is T4-T3-Tss.

The OLT repeats the above steps to open a quiet window for the second time, such as a quiet window of 10 μs. A starting time of the quiet window corresponds to a moment at which an uplink signal sent by an ONU distant from the OLT by 1 km arrives at the OLT, and an ending time of the quiet window corresponds to a moment at which an uplink signal sent by an ONU distant from the OLT by 2 km arrives at the OLT. By adopting the above method, the OLT finishes the ranging of the ONUs distant from the OLT by 1 km to 2 km, 2 km to 3 km . . . (L-1) km to L km, so that all the ONUs finish registration.

In the present example, the quiet windows opened by the OLT each time do not overlap, and in other embodiments, the quiet windows opened by the OLT at different times may partially overlap, for example, 0 km to 1.2 km for the first time, 1 km to 2.2 km for the second time, etc.

In the present embodiment, the ONU to be registered sends an uplink signal to the OLT with a low rate and a low optical power. The content includes identity information (serial number information or medium access address information) of the ONU and delay information D regarding sending the message. The ONU may send the above signal to the OLT once, and may also send multiple uplink signals to the OLT. The delay information D contained in each uplink signal is a time delay between the starting time Ts in the uplink bandwidth allocated to the ONU by the OLT and time at which the uplink signal is actually sent by the ONU.

EXAMPLE TWO

In the present example, a distance between the furthest ONU and an OLT supported in a PON system is set to L. For example, L is 20 km. A quiet window opened by the OLT to the ONUs for registration is divided into L quiet windows. Firstly, the OLT opens several discontinuous small quiet windows such as N discontinuous quiet windows of 10 μs. A starting time of the first quiet window corresponds to a moment at which an uplink signal sent by an ONU distant from the OLT by 0 km arrives at the OLT, and an ending time of the quiet window corresponds to a moment at which an uplink signal sent by an ONU distant from the OLT by 1 km arrives at the OLT. A starting time of the second quiet window of 10 μs corresponds to a moment at which an uplink signal sent by an ONU distant from the OLT by 5 km arrives at the OLT, and an ending time of the quiet window corresponds to a moment at which an uplink signal sent by an ONU distant from the OLT by 6 km arrives at the OLT. By analogy, a starting time of the fourth quiet window of 10 μs corresponds to a moment at which an uplink signal sent by an ONU distant from the OLT by 15 km arrives at the OLT, and an ending time corresponds to a moment at which an uplink signal sent by an ONU distant from the OLT by 16 km arrives at the OLT. Then, the OLT continuously opens several discontinuous small quiet windows. For example, a starting time of the first quiet window of 10 μs corresponds to a moment at which an uplink signal sent by an ONU distant from the OLT by 1 km arrives at the OLT, and an ending time of the quiet window corresponds to a moment at which an uplink signal sent by an ONU distant from the OLT by 2 km arrives at the OLT. A starting time of the second quiet window of 10 μs corresponds to a moment at which an uplink signal sent by an ONU distant from the OLT by 6 km arrives at the OLT, and an ending time of the quiet window corresponds to a moment at which an uplink signal sent by an ONU distant from the OLT by 7 km arrives at the OLT. By analogy, a starting time of the fourth quiet window of 10 μs corresponds to a moment at which an uplink signal sent by an ONU distant from the OLT by 16 km arrives at the OLT, and an ending time corresponds to a moment at which an uplink signal sent by an ONU distant from the OLT by 17 km arrives at the OLT.

The OLT repeats the above steps to ensure that all distances supported by the PON system are covered.

The OLT and the ONU send and receive data using the following main steps.

In step 1, the OLT sends a broadcast message to the ONU at a moment T1. The message content is that an uplink bandwidth is allocated to an ONU to be registered, and a starting time of sending uplink data allocated to the ONU in the uplink bandwidth is Ts. The OLT opens several small quiet windows such as four quiet windows of 10 μs. A starting time of the first quiet window corresponds to a moment at which an uplink signal sent by an ONU distant from the OLT by 0 km arrives at the OLT, and an ending time of the quiet window corresponds to a moment at which an uplink signal sent by an ONU distant from the OLT by 1 km arrives at the OLT. A starting time of the second quiet window corresponds to a moment at which an uplink signal sent by an ONU distant from the OLT by 5 km arrives at the OLT, and an ending time of the quiet window corresponds to a moment at which an uplink signal sent by an ONU distant from the OLT by 6 km arrives at the OLT. A starting time of the third quiet window corresponds to a moment at which an uplink signal sent by an ONU distant from the OLT by 10 km arrives at the OLT, and an ending time corresponds to a moment at which an uplink signal sent by an ONU distant from the OLT by 11 km arrives at the OLT. A starting time of the fourth quiet window corresponds to a moment at which an uplink signal sent by an ONU distant from the OLT by 15 km arrives at the OLT, and an ending time corresponds to a moment at which an uplink signal sent by an ONU distant from the OLT by 16 km arrives at the OLT.

In step 2, the ONU to be registered sends an uplink signal to the OLT with a low rate and a low optical power. The content includes identity information (serial number information or medium access address information) of the ONU and delay information D regarding sending the message.

In step 3, the OLT receives the uplink signals of the ONUs in all the opened quiet windows, if the OLT receives the uplink signal sent by the ONU in step 2 at a moment T2, the OLT calculates a loop delay value of the ONU as T2-T1-Ts-D, and the OLT calculates an optical fiber distance L of the ONU from the OLT as C*(T2-T1-Ts-D)/2, where C is the speed of signal light in optical fibers.

After the OLT finishes the preliminary ranging for the ONU, the OLT sends the allocated uplink bandwidth to the ONU at a moment T3. The starting time of allocation for the ONU in the upstream bandwidth is Tss. The OLT estimates time when the uplink data arrives at the OLT after the ONU adopts a normal rate at which the PON system transmits data according to a preliminary ranging result of the ONU. The OLT further opens an equal or smaller quiet window (for example, 5 μs) that includes the above time of arrival.

In step 4, after the ONU receives the bandwidth allocation of the OLT in step 3, the ONU sends an uplink signal to the OLT at the moment Tss using a normal rate and a normal optical power of data transmitted by the PON system currently.

In step 5, the OLT receives the data sent by the ONU in step 4 at a moment T4, the OLT finishes the accurate ranging of the ONU at the normal rate, and a loop delay is T4-T3-Tss.

If the OLT receives uplink signals of multiple ONUs in step 3, the OLT and each corresponding ONU perform steps 3 to 5 to complete ranging.

The OLT repeats the above steps to open the quiet windows for the second time, such as four quiet windows of 10 μs. A starting time of the first quiet window corresponds to a moment at which an uplink signal sent by an ONU distant from the OLT by 1 km arrives at the OLT, and an ending time of the quiet window corresponds to a moment at which an uplink signal sent by an ONU distant from the OLT by 2 km arrives at the OLT. A starting time of the second quiet window corresponds to a moment at which an uplink signal sent by an ONU distant from the OLT by 6 km arrives at the OLT, and an ending time of the quiet window corresponds to a moment at which an uplink signal sent by an ONU distant from the OLT by 7 km arrives at the OLT. A starting time of the third quiet window corresponds to a moment at which an uplink signal sent by an ONU distant from the OLT by 11 km arrives at the OLT, and an ending time corresponds to a moment at which an uplink signal sent by an ONU distant from the OLT by 12 km arrives at the OLT. A starting time of the fourth quiet window corresponds to a moment at which an uplink signal sent by an ONU distant from the OLT by 16 km arrives at the OLT, and an ending time corresponds to a moment at which an uplink signal sent by an ONU distant from the OLT by 17 km arrives at the OLT. By adopting the above method, the OLT finishes the ranging of the ONUs distant from the OLT by 0 to L, so that all the ONUs finish registration.

In the present example, the quiet windows opened by the OLT each time do not overlap, and in other embodiments, the quiet windows opened by the OLT at different times may partially overlap, for example, 0 km to 1.2 km for the first time, and 1 km to 2.2 km for the second time.

In the present example, the ONU to be registered sends an uplink signal to the OLT with a low rate and a low optical power. The content includes identity information (serial number information or medium access address information) of the ONU and delay information D regarding sending the message. The ONU may send the above signal to the OLT once, and may also send multiple uplink signals to the OLT. The delay information D contained in each uplink signal is a time delay between the starting time Ts in the uplink bandwidth allocated to the ONU by the OLT and time at which the uplink signal is actually sent by the ONU.

By using the scheme of the present embodiment, the OLT opens quiet windows for ONUs with different distance ranges in turn, the ONUs respond to the registered bandwidth allocation of the OLT using signals with low rate and low optical power in a registration process, and the OLT finishes the ranging of the ONUs. The influence of quiet windows on low-delay services in the conventional art is solved. The OLT opens a quiet window corresponding to a specific range to register a corresponding ONU so as to guarantee the low-delay demands of service transmission on the uplink.

The embodiments of the present disclosure further provide a computer-readable storage medium. A computer program is stored thereon. When the computer program is executed by a processor, the processor performs the communication method for an optical network or the ranging method for an optical network according to various embodiments of the present disclosure.

According to the embodiments of the present disclosure, the storage medium may be configured to store the computer program for performing the following steps. In S1, an OLT sends a broadcast message to an ONU, the broadcast message being used to indicate an uplink bandwidth allocated to the ONU. In S2, the OLT opens a quiet window for the ONU in a predetermined region. In S3, the OLT receives an uplink signal sent by the ONU at the quiet window.

According to the embodiments provided by the present disclosure, the computer-readable storage medium may include, but is not limited to, various media capable of storing a computer program such as a U disk, a ROM, a RAM, a mobile hard disk, a magnetic disk or an optical disc.

The embodiments of the present disclosure further provide an electronic device. The electronic device includes a memory and a processor. The memory stores a computer program. The processor is configured to run the computer program to perform the communication method for an optical network or the ranging method for an optical network according to various embodiments of the present disclosure.

According to the embodiments of the present disclosure, the electronic device may further include a transmission device and an input-output device. The transmission device is connected to the processor, and the input-output device is connected to the processor.

According to the embodiments of the present disclosure, the processor may be configured to perform the following steps through the computer program. In S1, an OLT sends a broadcast message to an ONU, the broadcast message being used to indicate an uplink bandwidth allocated to the ONU. In S2, the OLT opens a quiet window for the ONU in a predetermined region. In S3, the OLT receives an uplink signal sent by the ONU at the quiet window.

The specific examples in the embodiments of the present disclosure may refer to the examples described in the above embodiments and alternative implementation manners, and details are not described herein in the present embodiment.

It is apparent that a person skilled in the art shall understand that all of the above-mentioned modules or steps in the present disclosure may be implemented by using a general calculation apparatus, may be centralized on a single calculation apparatus or may be distributed on a network composed of multiple calculation apparatuses. Optionally, they may be implemented by using executable program codes of the calculation apparatuses. Thus, they may be stored in a storage apparatus and executed by the calculation apparatuses, the shown or described steps may be executed in a sequence different from this sequence under certain conditions, or they are manufactured into each integrated circuit module respectively, or multiple modules or steps therein are manufactured into a single integrated circuit module. Thus, the present disclosure is not limited to the combination of any specific hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. A communication method for an optical network, applied to an Optical Line Terminal (OLT), and comprising:
    sending a broadcast message to an Optical Network Unit (ONU), the broadcast message being used to indicate an uplink bandwidth allocated to the ONU;
    opening a quiet window for the ONU in a predetermined region; and
    receiving an uplink signal sent by the ONU at the quiet window;
    wherein opening a quiet window for an ONU in the predetermined region comprises:
    opening overlapping quiet windows for an ONU in a predetermined region within one or more preset cycles.

2. The method according to claim 1, wherein opening a quiet window for an ONU in the predetermined region comprises one of the following:
    opening a plurality of quiet windows for ONUs in a plurality of predetermined regions within a preset cycle, one predetermined region corresponding to one quiet window, and
    the plurality of predetermined regions corresponding to a plurality of non-adjacent quiet windows.

3. The method according to claim 1, wherein boundaries of adjacent predetermined regions overlap or boundaries of adjacent predetermined regions do not overlap.

4. The method according to claim 1, wherein the broadcast message is further used to instruct the ONU to respond to the uplink bandwidth using an out-of-band signal.

5. The method according to claim 1, wherein the starting moment of the quiet window is a moment at which an ONU with a minimum distance within the predetermined region sends an uplink signal to the OLT, and an ending moment of the quiet window is a moment at which an ONU with a maximum distance within the predetermined region sends an uplink signal to the OLT.

6. The method according to claim 1, wherein receiving the uplink signal sent by the ONU at the quiet window comprises:
    receiving a registration message sent by the ONU at the quiet window, the registration message carrying identity information of the ONU and/or delay information about sending the registration message; and
    ranging the ONU.

7. The method according to claim 1, wherein the predetermined region is an optical fiber distance between an ONU and an OLT in a Passive Optical Network (PON) system.

8. The method according to claim 1, further comprising:
    receiving, by the ONU, a broadcast message sent by the OLT, the broadcast message being used to indicate an uplink bandwidth allocated to the ONU; and
    sending, by the ONU, an out-of-band uplink signal to the OLT.

9. The method according to claim 8, wherein sending the out-of-band uplink signal to the OLT comprises:
    sending, by the ONU, a registration message to the OLT with a low rate and a low optical power, the registration message carrying identity information of the ONU and/or delay information about sending the registration message.

* * * * *